US012798666B2

(12) United States Patent
Walentowski et al.

(10) Patent No.: US 12,798,666 B2
(45) Date of Patent: Nov. 17, 2026

(54) STEER-BY-WIRE STEERING SYSTEM AND METHOD

(71) Applicant: ZF Active Safety GmbH, Koblenz (DE)

(72) Inventors: Stephan Walentowski, Koblenz (DE); Marcin Frys, Koblenz (DE); Magnus Rau, Stuttgart (DE); Luc Diebold, Stuttgart (DE); Jannick Widmann, Stuttgart (DE); Tobias Schlingmann, Stuttgart (DE); Andreas Beicht, Stuttgart (DE)

(73) Assignee: ZF Active Safety GmbH, Koblenz (DE)

( * ) Notice: Subject to any disclaimer, the term of this patent is extended or adjusted under 35 U.S.C. 154(b) by 10 days.

(21) Appl. No.: 19/239,242

(22) Filed: Jun. 16, 2025

(65) Prior Publication Data

US 2025/0388259 A1 Dec. 25, 2025

(30) Foreign Application Priority Data

Jun. 20, 2024 (DE) ........................ 102024117505.2

(51) Int. Cl.
*B62D 5/04* (2006.01)
*B62D 7/15* (2006.01)

(52) U.S. Cl.
CPC .......... *B62D 5/0484* (2013.01); *B62D 7/159* (2013.01)

(58) Field of Classification Search
CPC ............................ B62D 5/0484; B62D 7/159
USPC ............................................................ 701/41
See application file for complete search history.

(56) References Cited

U.S. PATENT DOCUMENTS

2023/0055296 A1* 2/2023 LaBarbera ............ B60T 8/1755
2023/0058353 A1* 2/2023 LaBarbera ............ B62D 5/006

* cited by examiner

*Primary Examiner* — Tiffany P Young
(74) *Attorney, Agent, or Firm* — McNees Wallace & Nurick LLC

(57) ABSTRACT

A steer-by-wire steering system for a vehicle is indicated, having a steering unit which has a steering wheel angle detection unit for detecting a steering wheel angle adjusted on a steering wheel by a driver and a rack-and-pinion unit for adjusting a steering angle on a vehicle axle, for example a vehicle front axle, wherein the steering wheel angle detection unit is configured to translate the steering wheel angle adjusted by the driver into a steering angle request and to pass the steering angle request on to the rack-and-pinion unit, which is configured to adjust an axial position of a rack in accordance with the steering angle request. The steering system further has at least one electronic system which is provided outside the steering unit and coupled to the steering unit via electronic lines in terms of signaling, wherein the at least one electronic system is an electronic fallback system and, together with the steering unit, constitutes an emergency steering functional system. Furthermore, a method of steering a vehicle by means of a steer-by-wire steering system is indicated.

17 Claims, 4 Drawing Sheets

STEER-BY-WIRE STEERING SYSTEM AND METHOD

TECHNICAL FIELD

The present disclosure relates to a steer-by-wire steering system and a method of steering a vehicle by means of a steer-by-wire steering system.

BACKGROUND

A steer-by-wire steering system is understood to be a steering system in which a steering command is passed on exclusively electronically to a steering rack actuator which adjusts a steering angle. There exists no mechanical steering connection between a steering wheel and the vehicle wheels.

In order to ensure sufficient safety against failure, it is known to provide a fallback level so that sufficient steerability of the vehicle can be maintained in the event of failure of a singular component.

In the event of a failure of multiple components, it may occur that steerability is no longer given. In this case, the vehicle is usually placed in a creep mode, in which the vehicle speed is limited to the extent that the vehicle can be safely brought to a standstill at any time by braking.

It would, however, be desirable for the vehicle to still be able to be steered in the event of failure of a component.

It is therefore an object of the present disclosure to keep up at least a residual steerability of a vehicle having a steer-by-wire steering system for as long as possible.

SUMMARY

The present disclosure provides a steer-by-wire steering system for a vehicle, including a steering unit which includes a steering wheel angle detection unit for detecting a steering wheel angle adjusted on a steering wheel by a driver and a rack-and-pinion unit for adjusting a steering angle on a vehicle axle, for example a vehicle front axle, wherein the steering wheel angle detection unit is configured to translate the steering wheel angle adjusted by the driver into a steering angle request and to pass the steering angle request on to the rack-and-pinion unit, which is configured to adjust an axial position of a rack in accordance with the steering angle request. The steering system further includes at least one electronic system which is provided outside the steering unit and coupled to the steering unit via electronic lines in terms of signaling.

The steering wheel angle detection unit has redundant steering wheel angle sensors and redundant steering angle processors coupled to each other in terms of communication, and the rack-and-pinion unit has redundant rack actuators and has actuator processors coupled to each other in terms of communication. The steering angle processors process, for example, the signals of the steering wheel angle sensors.

Each steering angle processor is connected to an associated actuator processor by means of its own communication line so that the steering unit is configured to compensate for at least a failure of a singular component of the steering unit internally in the steering unit such that a signal transmission is effected from a steering wheel angle sensor via a steering angle processor to an actuator processor and a rack actuator and thereby the steerability is maintained without restriction when the singular fault occurs.

The at least one electronic system is an electronic fallback system and, together with the steering unit, constitutes an emergency steering functional system, so that upon an occurrence of failures of a plurality of components in which a steerability cannot be maintained by the steering unit alone, a signal transmission between the steering unit and the at least one system is enabled in order to maintain at least a residual steerability of the vehicle. The failed components are, for example, communication links, steering wheel angle sensors, steering angle processors, rack actuators and actuator processors.

The gist of the present disclosure is to establish additional fallback levels that serve to maintain steerability in the event of a failure of components of the steering unit. In this way, at least a residual steerability can be maintained for a particularly long time.

The electronic fallback system will only be resorted to when a steerability cannot be maintained by the steering unit alone. This means that a compensation of faults within the steering unit is prioritized over a compensation by means of the electronic system provided outside the steering unit. A compensation within the steering unit usually allows a more precise adjustment of the steering angle than a compensation by means of the electronic system provided outside the steering unit.

As a result, the steering system according to example embodiments has a particularly high level of safety against failure and, in addition, offers improved steering comfort in the case of a fault. More precisely, the system is robust against first faults, that is, the failure of a singular component does not have an impact on the steering behavior, and additionally, even in the event of a failure of several components, a residual steerability is realized, so that the vehicle can be maneuvered at least to a parking location.

A further advantage of the present disclosure is that the system provided outside the steering unit comprises such systems as are usually already existing in the vehicle, for example a rear axle steering system and/or an electronic stability system. This allows the additional fallback levels to be implemented particularly cost-effectively.

The at least one system provided outside the steering unit may be coupled to at least one steering angle processor in terms of signaling and can receive control signals from the steering angle processor. Specifically, the steering angle processor can control the system in accordance with a desired steering angle. In this way, a residual steerability of the vehicle is realized.

According to one embodiment, a first steering wheel angle sensor, a first steering angle processor, a first rack actuator and a first actuator processor of the steering unit are supplied with electrical energy by a first power supply unit, for example from a first on-board power supply, and a second steering wheel angle sensor, a second steering angle processor, a second rack actuator and a second actuator processor of the steering unit are supplied with electrical energy by a second power supply unit, for example from a second on-board power supply. This additionally increases the level of safety against failure of the steering system since the steering system is able to maintain unrestricted steerability even in the event of a power failure of an on-board power supply.

The steer-by-wire steering system includes, for example, a first vehicle bus and a second vehicle bus, the first steering angle processor and the first actuator processor for example being configured to communicate with each other also via the first vehicle bus, and the second steering angle processor and the second actuator processor for example being configured to communicate with each other also via the second vehicle bus. Therefore, a signal transmission between the steering angle processors and the actuator processors can continue to be maintained even in the event of a failure of the direct communication link between the steering angle processors and the actuator processors, so that a steering angle request can be transmitted to the actuator processors.

According to one embodiment, a system provided outside the steering unit is an additional, external steering wheel angle sensor which is coupled to at least one actuator processor in terms of signaling. This establishes an additional fallback level, since the actuator processors still have access to a steering angle signal even if no corresponding steering angle signal is provided by the steering wheel angle detection unit to the actuator processors. In this case, the translation of the steering wheel angle into a steering angle request can take place in the actuator processor.

As a result, information about a steering wheel angle can still be transmitted to the rack-and-pinion unit even if the steering wheel angle detection unit is no longer able to do so because either the steering wheel angle sensors or the steering angle processors or the respective signal lines have failed, so that no steering angle request can be transmitted from the steering wheel angle detection unit to the rack-and-pinion unit. In particular, a steering angle signal can still be transmitted to the actuator processors by means of the external steering wheel angle sensor even in the case of a total failure of the steering wheel angle detection unit.

The external steering wheel angle sensor is for example configured to detect a steering wheel angle and to write the steering angle signal detected to both the first vehicle bus and the second vehicle bus. By the steering angle signal detected being written to both the first and the second vehicle bus, both actuator processors can access the steering angle signal. Therefore, a single external steering wheel angle sensor is sufficient to transmit a steering angle signal to each of the two actuator processors as required. This is advantageous with regard to manufacturing costs.

The rack-and-pinion unit, for example the first actuator processor and/or the second actuator processor, is for example configured to read out the steering angle signal written to the first and second vehicle buses by the external steering wheel angle sensor from one of the two vehicle buses and to control the rack actuator accordingly. The steering angle signal therefore does not need to be actively transmitted to the rack-and-pinion unit, but can be read out at any time if required.

According to one embodiment, the steering angle processors and the actuator processors are configured to write an activity signal to one of the first and second vehicle buses, the two vehicle buses being connected to each other in terms of communication. This allows the various processors, for example the steering angle processors and the actuator processors, to determine whether further processors in the respective other unit are still active if the communication within the steering unit is interrupted. Depending on which processors are still active, a decision can be made on the way in which a residual steerability is maintained.

The at least one system arranged outside the steering unit may be a rear axle steering system and/or an electronic stability system, and the steering wheel angle detection unit may be configured to send a steering angle request to the rear axle steering system and/or a target yaw rate to the electronic stability system via the first vehicle bus or the second vehicle bus in the event of a failure of the rack-and-pinion unit. This causes an emergency steering to be implemented by means of which the vehicle can still be steered sufficiently well, at least at low speeds.

The maximum vehicle speed is for example limited if the steering of the vehicle is performed by means of the rear axle steering system and/or the electronic stability system upon failure of the rack-and-pinion unit.

A failure of the rack-and-pinion unit refers to a condition in which the rack-and-pinion unit is no longer able to implement a steering angle request, for example if both rack actuators and/or both actuator processors have failed.

The steering wheel angle detection unit is for example configured to send a steering angle request to the rear axle steering system and/or a target yaw rate to the electronic stability system only if, in the event of a failure of the communication links between the steering angle processors and the actuator processors, no activity signal of one of the two actuator processors can be read out on at least one of the two vehicle buses and/or if both rack actuators have failed. In this way, it is ensured that when an electronic system provided outside the steering unit has to be resorted to in order to maintain a steerability, the external steering wheel angle sensor will be accessed with priority as long as at least one actuator processor with the associated rack actuator is still intact. In fact, the steering angle signal of the external steering wheel angle sensor processed in the actuator processor can be used to achieve more precise steering than when using the rear axle steering system or the electronic stability system. If, on the other hand, the steering angle processor receives an activity signal of an actuator processor, the steering angle processor will remain inactive.

The steering system may be configured to compare a steering wheel angle detected by the external steering wheel angle sensor with a steering wheel angle detected by the steering wheel angle sensors and to determine an offset. The comparison is carried out for example before a fault occurs in the steering unit. In the event of failure of the steering wheel angle detection unit, when the signal of the external steering wheel angle sensor is used, this offset can be taken into account so that measurement deviations of the various steering wheel angle sensors will not lead to deviations in the adjustment of the steering angle. For a vehicle occupant, a changeover to the external steering angle sensor is therefore not perceptible at best.

A braking system, a rear axle steering system, an electronic stability system and an external steering wheel angle sensor are, for example, provided as electronic systems located outside the steering unit.

The steer-by-wire steering system may be configured to send an activity signal from a steering angle processor to a non-associated actuator processor via the braking system, and vice versa. This means that an activity signal can be exchanged, via the braking system, between a steering angle processor and an actuator processor that are not directly connected to each other in terms of communication. For example, the two vehicle buses are connected to each other via an internal communication channel of the braking system, so that the activity signal can be exchanged between the vehicle buses for example via the braking system.

Alternatively or additionally, in the event of a failure of the rack-and-pinion unit, for example if no activity signal of the rack-and-pinion unit can be determined, the steering wheel angle detection unit may be configured to send a steering angle request to the rear axle steering system and/or a target yaw rate to the electronic stability system, which controls the braking system accordingly in order to maintain a residual steerability in the event of a failure of the rack-and-pinion unit.

Alternatively or additionally, in the event of a failure of the steering wheel angle detection unit or in the event of a failure of the communication link between the steering wheel angle detection unit and the rack-and-pinion unit, the rack-and-pinion unit may be configured to read out a steering wheel angle signal of the external steering wheel angle sensor, for example via the vehicle bus, and to translate it into a steering angle request and to control the first rack actuator or the second rack actuator accordingly. A failure of the communication link is understood to mean that a steering angle request cannot be transmitted on any path from the steering wheel angle detection unit to the actuator processors, not even via a vehicle bus.

Considered altogether, both a failure of the steering wheel angle detection unit and a failure of the rack-and-pinion unit can therefore be compensated for by at least one of the external electronic systems. The preferred variant here is to maintain steerability by using the steering angle signal of the external steering wheel angle sensor, if this is possible. Only if this is not possible is a steering performed by means of the rear axle steering system or the electronic stability system through appropriate control by a steering angle processor.

The object is furthermore achieved according to the present disclosure by a method of steering a vehicle by means of a steer-by-wire steering system according to an example embodiment, wherein upon the occurrence of a failure of a singular component, a compensation of the fault is effected internally in the steering unit, and in the event of a failure of a plurality of components, a check is made as to whether or not a steerability can be maintained by the steering unit alone, and only if this is not the case is a signal transmission used between the steering unit and at least one system provided outside the steering unit in order to compensate for the faults that have occurred and to maintain at least a residual steerability.

As has already been described in connection with the steering system according to the present disclosure, a high level of safety against failure is achieved in this way, combined with a high level of driving comfort. In particular, a residual steerability can be maintained for a particularly long time.

The steer-by-wire steering system may include a first vehicle bus and a second vehicle bus, wherein the first steering angle processor and the first actuator processor are configured to communicate with each other also via the first vehicle bus, and the second steering angle processor and the second actuator processor are configured to communicate with each other also via the second vehicle bus, wherein when, upon the occurrence of multiple faults, a residual steerability cannot be maintained by the steering unit alone, the first or the second actuator processor reads out a steering signal of an external steering wheel angle sensor via the first vehicle bus or the second vehicle bus and controls the first or the second rack actuator accordingly. As already discussed above in connection with the steering system, this allows a steerability to be maintained even when no steering angle request can be transmitted from the steering wheel angle detection unit to the rack-and-pinion unit due to a component failure.

Preferably, when upon the occurrence of multiple faults, a residual steerability cannot be maintained by the steering unit alone and, in addition, a control of the first or the second rack actuator is also not possible, for example because both rack actuators and/or both actuator processors have failed, the steering wheel angle detection unit sends a steering angle signal to a rear axle steering system and/or a target yaw rate to an electronic stability system via the first and/or the second vehicle bus. In this way, a residual steerability can be maintained, even if the rack-and-pinion unit has failed.

Upon the occurrence of a failure in which the failure of a further component cannot be compensated by the steering unit, a maximum vehicle speed may be limited to a defined value, for example to 80 km/h, and a maximum driving time for which a journey can be continued at the defined maximum vehicle speed may be fixed. The maximum driving time is, for example, up to 20 minutes. This ensures that if a fault occurs during the journey, a driver can at least maneuver the vehicle to a parking location.

After the maximum driving time has elapsed or if, during the driving time, a failure of a further component occurs, due to which a residual steerability cannot be maintained by the steering unit alone, the vehicle may be placed in a creep mode. In creep mode, a maximum vehicle speed is limited to up to 10 km/h. At such a speed, the vehicle can still be maneuvered safely even if only an emergency steering function is available, for example if a steering is performed by means of the rear axle steering system and/or by means of the electronic stability system.

DETAILED DESCRIPTION

Figure 1:
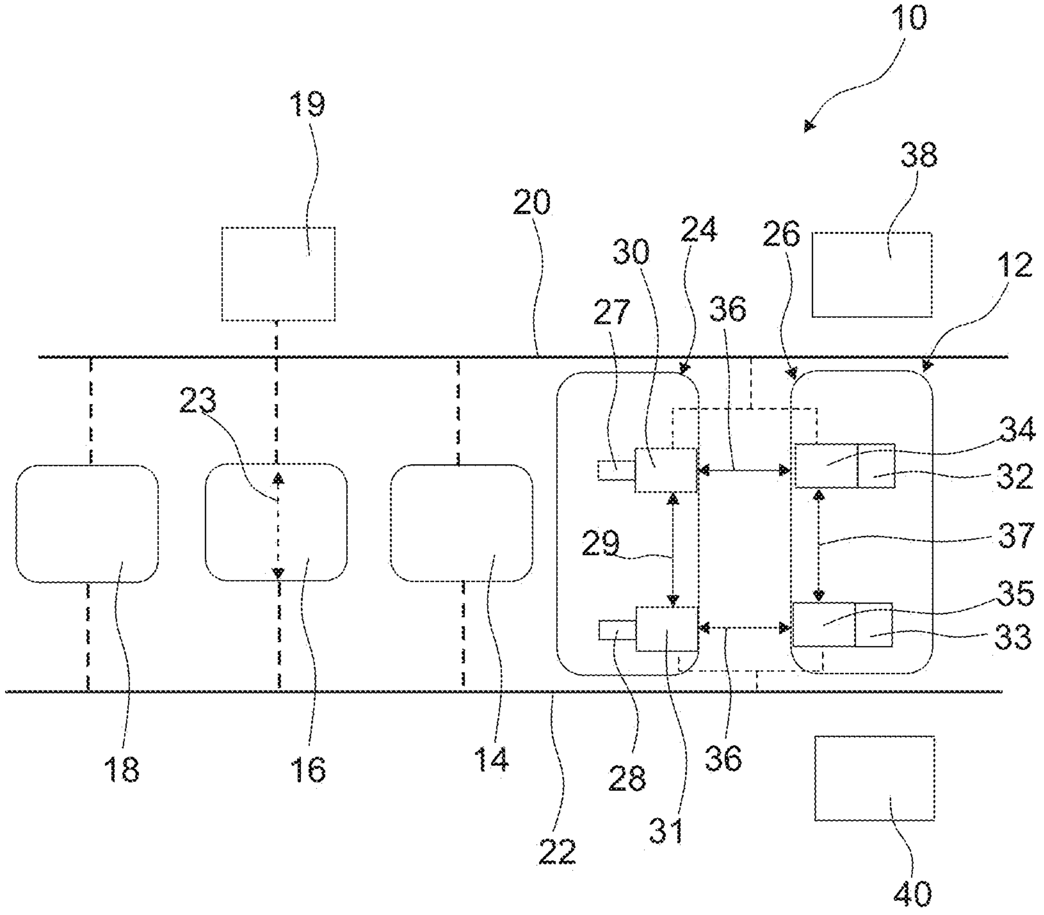
FIG. 1 shows a diagram of a steer-by-wire steering system according to an example embodiment.

FIG. 1 schematically illustrates a steer-by-wire steering system 10.

The steering system 10 comprises a steering unit 12 and a plurality of electronic systems 14, 16, 18, 19 located outside the steering unit 12.

Specifically, the electronic systems are an external steering wheel angle sensor 14, a braking system 16, a rear axle steering system 18 and/or an electronic stability system 19.

Both the steering unit 12 and the electronic systems 14, 16, 18, 19 are each connected to a first vehicle bus 20 and a second vehicle bus 22 in terms of signaling, which will be described in detail below.

The vehicle buses 20, 22 are connected to each other in terms of communication. In the exemplary embodiment, the connection in terms of communication is implemented via an internal communication channel 23 of the braking system 16. The amount of data that can be transmitted via this communication channel 23 is generally limited.

The steering unit 12 comprises a steering wheel angle detection unit 24 for detecting a steering wheel angle adjusted on a steering wheel by a driver and a rack-and-pinion unit 26 for adjusting a steering angle on a vehicle axle, for example a vehicle front axle.

The steering wheel angle detection unit 24 has redundant steering wheel angle sensors 27, 28, and has redundant steering angle processors 30, 31 coupled to each other by means of a communication line 29.

Each steering wheel angle sensor 27, 28 is coupled to one of the two steering angle processors 30, 31 in terms of communication.

The rack-and-pinion unit 26 has redundant rack actuators 32, 33, and has actuator processors 34 coupled to each other by means of a communication line 37.

Each rack actuator 32, 33 is coupled to one of the two actuator processors 34, 35 in terms of communication.

Preferably, the communication line 29 is provided exclusively for communication between the steering angle processors 30, 31, and/or the communication line 37 is provided exclusively for communication between the actuator processors 34, 35.

Each of the two steering angle processors 30, 31 is connected to an associated actuator processor 34, 35 by means of a separate communication line 36.

Preferably, these communication lines 36 are provided exclusively for communication between a steering angle processor 30, 31 and the associated actuator processor 34, 35.

In addition, the two steering angle processors 30, 31 are configured to communicate with each other with their associated actuator processor 34, 35 also by means of the respective vehicle bus 20, 22.

The steering wheel angle detection unit 24 is configured to translate the steering wheel angle adjusted by the driver into a steering angle request and to pass the steering angle request on to the rack-and-pinion unit 26, which is configured to adjust an axial position of a rack in accordance with the steering angle request, for example by driving or controlling a rack actuator 32, 33 accordingly.

The braking system 16, the rear axle steering system 18 and the electronic stability system 19 are coupled to the steering unit 12 in terms of signaling via the vehicle buses 20, 22 and additional electronic lines, more precisely to the steering angle processors 30, so that the braking system 16, the rear axle steering system 18 and the electronic stability system 19 can receive control signals from the steering angle processors 30.

The steer-by-wire steering system 10 further comprises a first power supply unit 38 and a second power supply unit 40, wherein a first steering wheel angle sensor 27, a first steering angle processor 30, a first rack actuator 32 and a first actuator processor 34 of the steering unit 12 are supplied with electrical energy by the first power supply unit 38, and a second steering wheel angle sensor 28, a second steering angle processor 31, a second rack actuator 33 and a second actuator processor 35 of the steering unit are supplied with electrical energy by the second power supply unit 40. The steering unit 12 therefore has two paths that are independent of each other and are each capable of transmitting a steering angle request. For the sake of simplicity, the respective electrical lines are not illustrated.

The electronic systems 14, 16, 18, 19 provided outside the steering unit 12 can be supplied with electrical energy both by the first power supply unit 38 and by the second power supply unit 40.

The external steering wheel angle sensor 14, which is provided outside the steering unit 12, is coupled to the actuator processors 34, 35 in terms of signaling.

In particular, the external steering wheel angle sensor 14 is configured to detect a steering wheel angle and to write the steering angle signal acquired to both the first vehicle bus 20 and the second vehicle bus 22.

The actuator processors 34, 35 are, in turn, configured to read out the steering angle signal from the associated vehicle bus 20, 22.

In addition, the actuator processors 34, 35 and also the steering angle processors 30, 31 are configured to write an activity signal to the first vehicle bus 20 and second vehicle bus 22 respectively associated with them. The function of the activity signal will be discussed further below.

By providing the steering wheel angle sensors 27, 28, the steering angle processors 30, 31, the rack actuators 32, 33 and the actuator processors 34, 35 to be redundant, the steering unit 12 is configured to compensate for at least a failure of a singular component of the steering unit 12 internally in the steering unit 12. This may also be a failure of a communication line.

A compensation internally in the steering unit means that a signal transmission is performed from a steering wheel angle sensor 27, 28 via a steering angle processor 30, 31 to an actuator processor 34, 35 and a rack actuator 32, 33, thereby maintaining steerability without restriction when the singular fault occurs. Signal transmission may be effected here either via a communication line 36 or via one of the two vehicle buses 20, 22.

Typically, one of the two steering angle processors 30, 31, for example the first steering angle processor 30, acts as a master of the steering wheel angle detection unit 24. Similarly, one of the two actuator processors 34, 35, for example the first actuator processor 34, acts as a master of the rack-and-pinion unit 26.

In an initial state, in which all components are in proper working order, the first steering angle processor 30 processes a steering wheel angle detected by the first steering wheel angle sensor 27 and transmits a corresponding steering angle request to the first actuator processor 34, which in turn controls the first rack actuator 32.

The steering system 10 is furthermore configured to compare a steering wheel angle detected by the external steering wheel angle sensor 14 with a steering wheel angle detected by the steering wheel angle sensors 27, 28 and to determine an offset. This offset is taken into account when using the steering wheel angle detected by the external steering wheel angle sensor 14.

FIGS. 2 to 5 illustrate several fault scenarios which can be compensated for internally in the steering unit 14 without the steerability being impaired.

Figure 2:
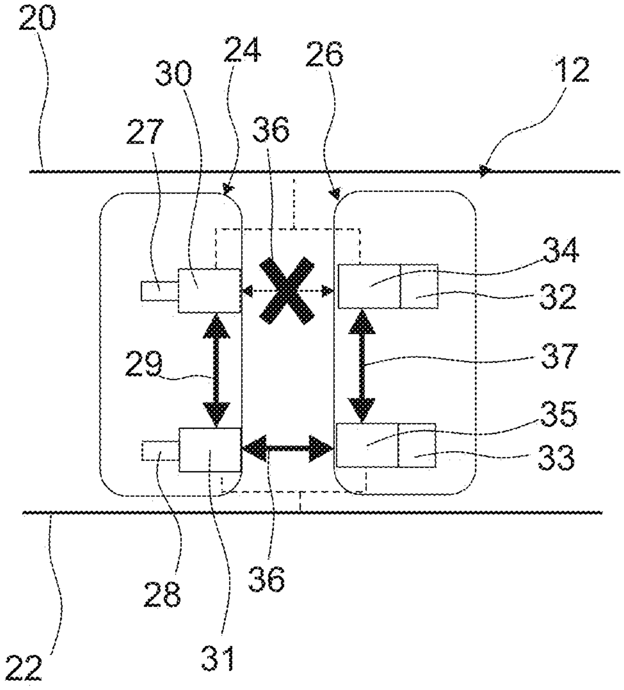
FIG. 2 shows a steering unit of the steer-by-wire steering system from FIG. 1, illustrating a first fault case of the steering unit.

In the fault case illustrated in FIG. 2, the communication line 36 between the first steering angle processor 30 and the first actuator processor 34 has failed.

In this case, the steering angle request is transmitted starting from the first steering angle processor 30 via the second steering angle processor 31 and the second actuator processor 35 to the first actuator processor 34, which then controls the first rack actuator 32.

The path of the signal transmission is shown more clearly by reinforced lines and double arrows for better illustration.

Figure 3:
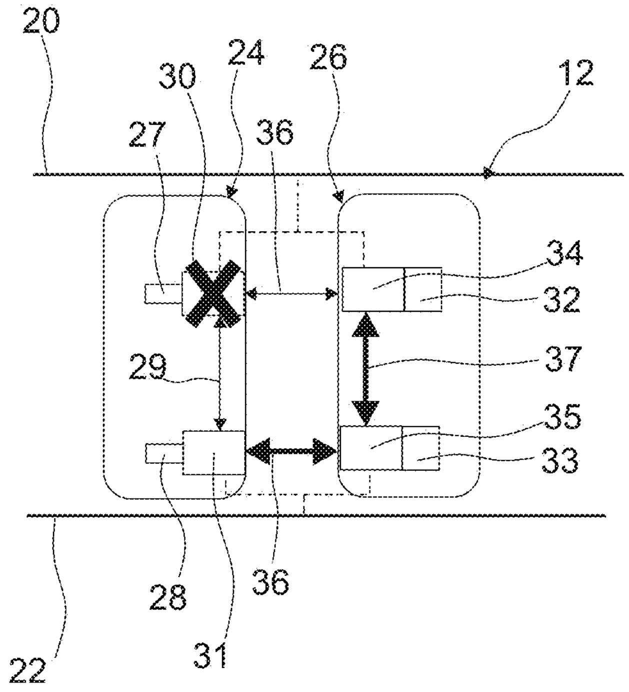
FIG. 3 shows the steering unit of the steer-by-wire steering system from FIG. 1, illustrating a further fault case of the steering unit.

In the fault case illustrated in FIG. 3, the first steering angle processor 30 has failed. In this case, the second steering angle processor 31 assumes the role of master and transmits the steering angle request via the second actuator processor 35 to the first actuator processor 34, which then controls the first rack actuator 32.

Figure 4:
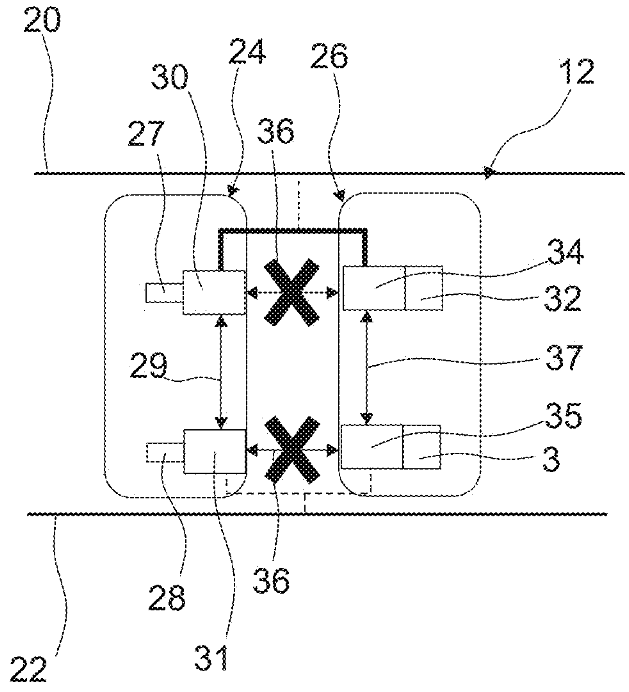
FIG. 4 shows the steering unit of the steer-by-wire steering system from FIG. 1, illustrating a still further fault case of the steering unit.

In the fault case illustrated in FIG. 4, both communication lines 36 between the steering angle processors 30, 31 and the actuator processors 34, 35 have failed. In this case, the first steering angle processor 30 sends the steering angle request to the first vehicle bus 20. The respective information can be read out by the first actuator processor 34, which then controls the first rack actuator 32.

Figure 5:
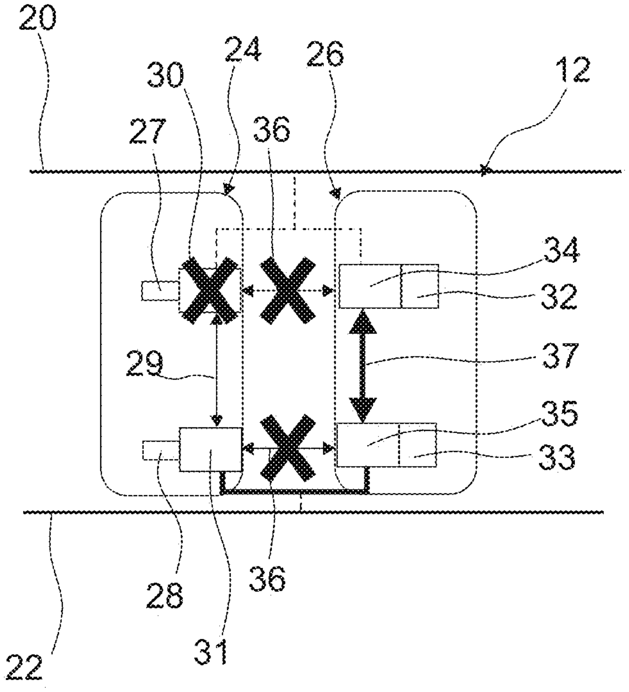
FIG. 5 shows the steering unit of the steer-by-wire steering system from FIG. 1, illustrating yet another fault case of the steering unit.

In the fault case illustrated in FIG. 5, the first steering angle processor 30 has failed in addition to the communication lines 36.

In this case, the second steering angle processor 31 again assumes the function of the master and sends a steering angle request to the second vehicle bus 22. The respective information can be read out by the second actuator processor 35, which forwards the corresponding steering angle request to the first actuator processor 34, which then controls the first rack actuator 32.

In a further exemplary embodiment, a power supply unit 38, 40 may fail, with the components associated with the non-failed power supply unit taking over the steering.

Further fault cases are conceivable, which are, however, not mentioned in detail for the sake of simplicity.

In all of the aforementioned fault cases, the failure of a component is compensated for internally in the steering unit 12, with a steerability of the vehicle being maintained without restriction.

The driver will usually be notified upon occurrence of a fault.

If a fault condition arises in which the steering unit cannot compensate for a further failure of a component of the steering unit 12 in such a manner that a steerability is maintained by the steering unit 12 without restriction, a warning is for example issued to the driver.

Moreover, a speed limitation takes place in this case, in which the maximum vehicle speed is limited to a defined value, for example to 80 km/h.

In addition, for example, a maximum driving time is fixed for which a journey can be continued at the defined maximum vehicle speed. In this case, the maximum driving time is 20 minutes, for example.

Once the maximum driving time has elapsed or if, during the driving time, a failure of a further component occurs due to which a residual steerability cannot be maintained by the steering unit alone, the vehicle is placed in a creep mode.

In the creep mode, a vehicle speed is limited to a maximum of 10 km/h so that the vehicle can be safely brought to a standstill at any time by braking the vehicle.

Figure 7:
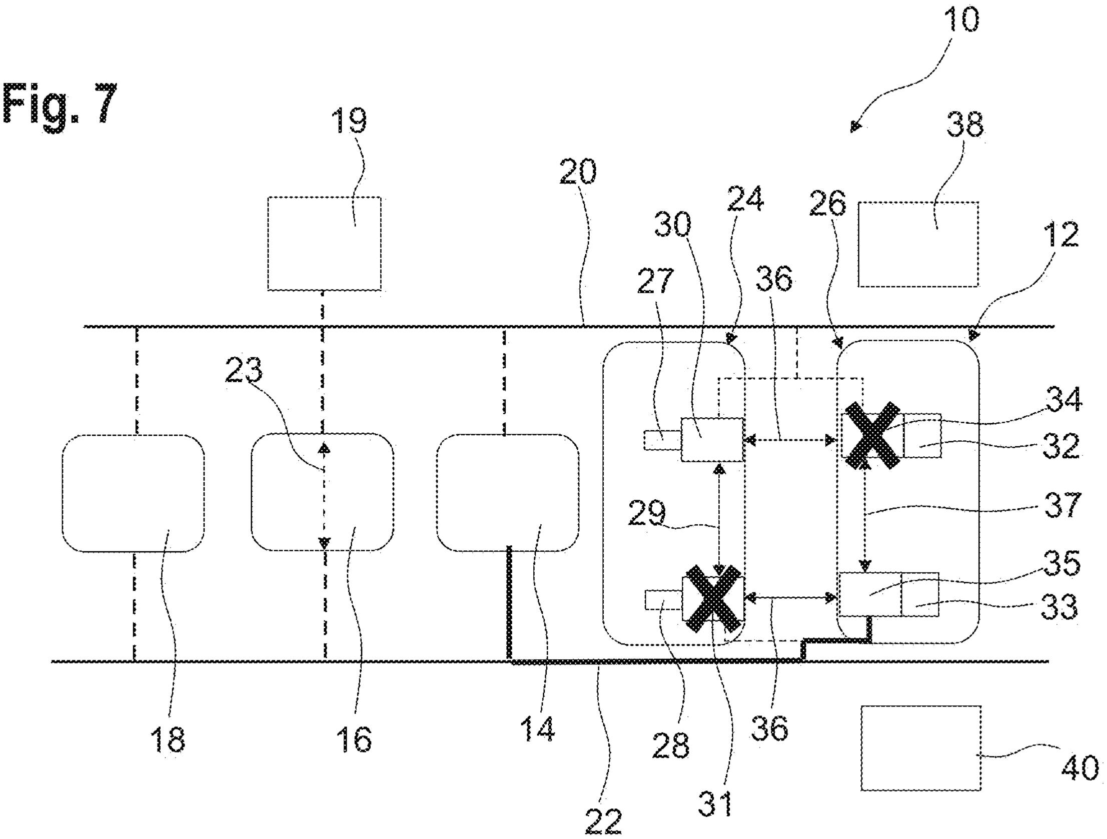
FIG. 7 shows the steer-by-wire steering system from FIG. 1, illustrating a further fault case in which a residual steerability cannot be maintained by the steering unit alone.
Figure 8:
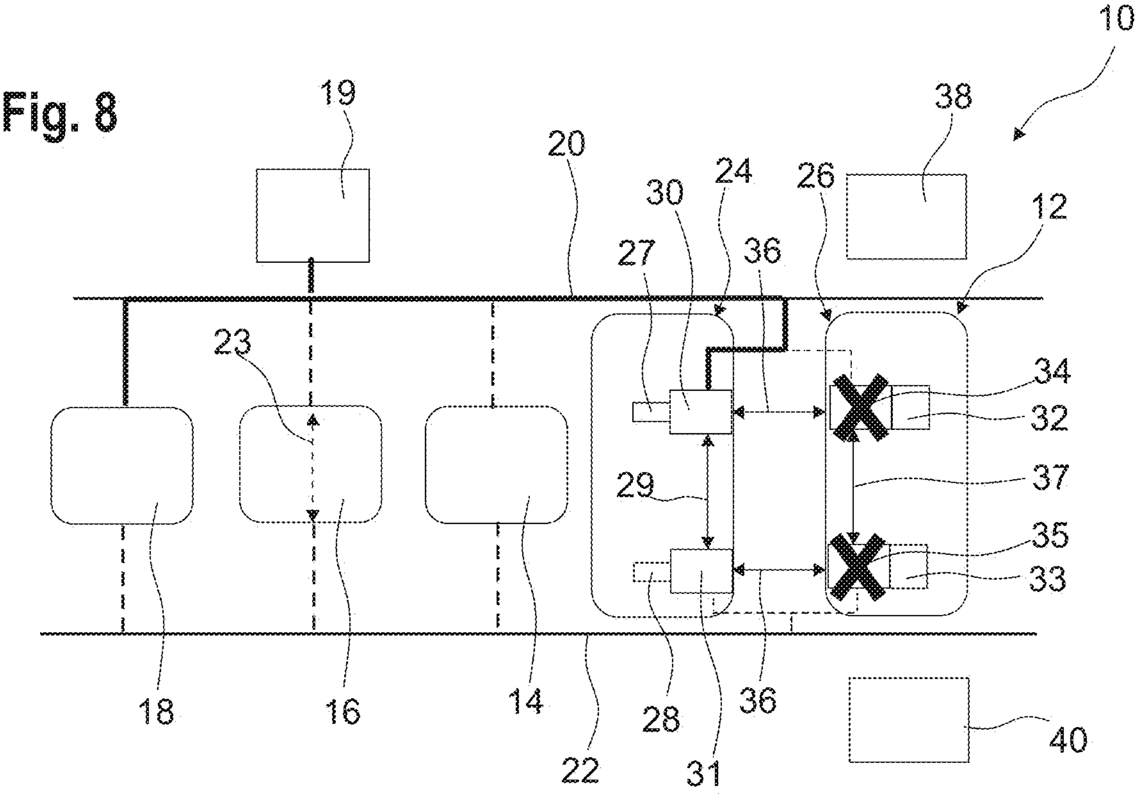
FIG. 8 shows the steer-by-wire steering system from FIG. 1, illustrating yet another fault case in which a residual steerability cannot be maintained by the steering unit alone.

If, in the event of the occurrence of multiple faults in the steering unit 12, a steerability cannot be maintained by the steering unit 12 alone, a residual steerability can be realized by means of the electronic systems 14, 16, 18, 19 provided outside the steering unit 12. Such scenarios are illustrated in FIGS. 6 to 8.

In this case, the electronic systems 14, 16, 18, 19 provided outside the steering unit 12 constitute an electronic fallback system, that is, the electronic systems 14, 16, 18, 19 together with the steering unit constitute an emergency steering functional system. The residual steerability is maintained for example in that a signal transmission between the steering unit 12 and the systems 14, 16, 18, 19 is enabled. This will be discussed below with reference to several exemplary embodiments.

Figure 6:
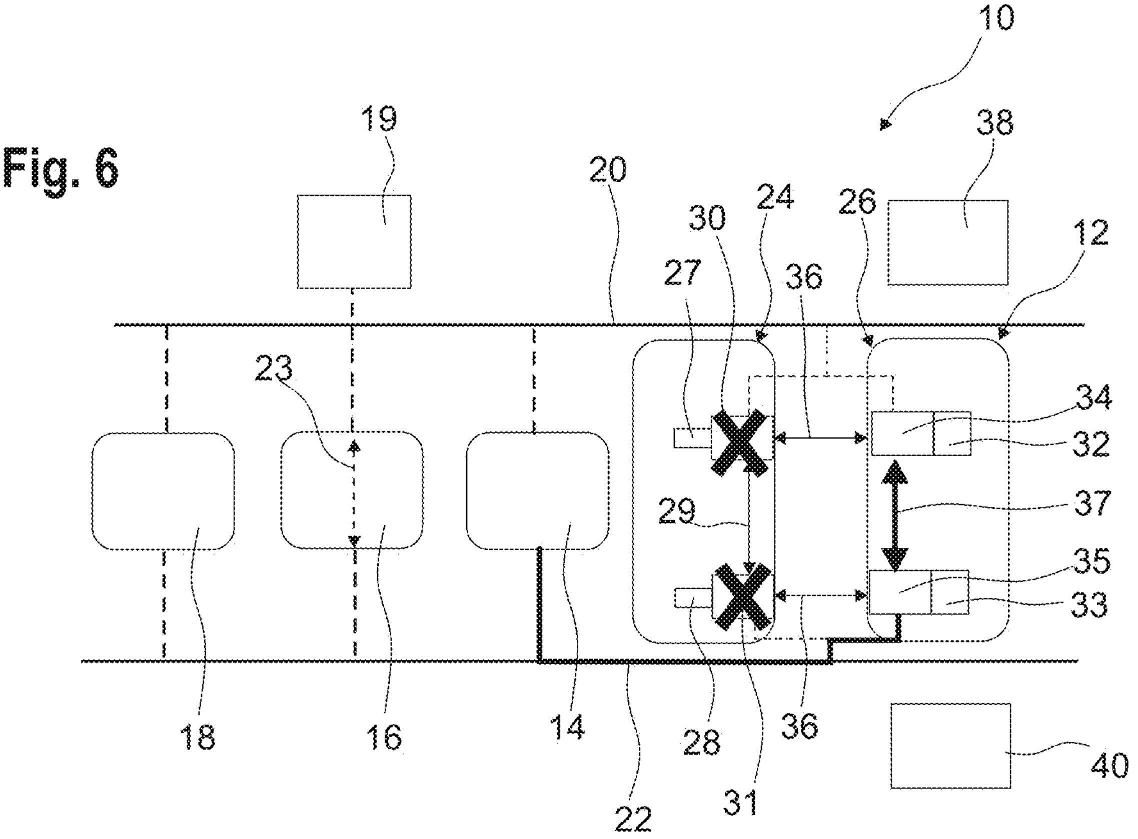
FIG. 6 shows the steer-by-wire steering system from FIG. 1, illustrating a fault case in which a residual steerability cannot be maintained by the steering unit alone.

FIG. 6 illustrates a scenario in which both steering angle processors 30, 31 have failed. Consequently, no steering angle request can be transmitted from the steering angle processors 30, 31 to the actuator processors 34, 35.

Should this happen, the rack-and-pinion unit 26, more precisely the actuator processors 34, 35, are configured to read out a steering wheel angle signal of the external steering wheel angle sensor 14 and to translate it into a steering angle request, and to control the first rack actuator 32 or the second rack actuator 33 accordingly. Consequently, sufficient residual steerability can be maintained by means of the steering wheel angle signal of the external steering wheel angle sensor 14.

Here, the offset between the steering wheel angle detected by the external steering wheel angle sensor 14 and the steering wheel angle sensors 27, 28 of the steering wheel angle detection unit 24 is taken into account.

FIG. 7 illustrates an exemplary embodiment in which the second steering angle processor 31 and the first actuator processor 34 have failed. Signal transmission between the steering wheel angle detection unit 24 and the rack-and-pinion unit 26 is thus no longer possible, neither via the communication lines 36 nor via the vehicle buses 20, 22.

In the case of such a fault pattern, a residual steerability can basically be maintained either by using the steering wheel angle detected by the external steering wheel angle sensor 14 in one of the actuator processors 34, 35 or in that the steering wheel angle detection unit 24, more precisely one of the steering angle processors 30, 31, sends a steering angle request to the rear axle steering system 18 and/or a target yaw rate to the electronic stability system 19.

The first-mentioned case is preferred here, since in this way a better steerability, for example a more precise steering angle, can be achieved. This means that as long as an actuator processor 34, 35 is able to control a rack actuator 32, 33, the steering wheel angle detection unit 24 will not become active in the case of such a fault pattern.

In order to ensure an appropriate prioritization, both the remaining steering angle processor 30 and the remaining actuator processor 35 will send an activity signal to the associated vehicle bus 20, 22.

As already mentioned above, the vehicle buses 20, 22 are connected to each other in terms of communication via an internal communication channel 23 of the braking system 16, so that the remaining steering angle processor 30 can read out the activity signal of the actuator processor 35 and vice versa.

When the first steering angle processor 30 receives an activity signal from the second actuator processor 35, the steering angle processor 30 remains inactive and gives priority to the actuator processor 35.

The second actuator processor 35 then drives or controls the second rack actuator 33 using the steering wheel angle signal stored on the vehicle bus 22 by the external steering wheel angle sensor 14 and taking into account the offset of the steering wheel angle signal of the external steering wheel angle sensor 14, such as has already been described in connection with FIG. 6.

The process described above will also take place correspondingly in the event of failure of the first steering angle processor 30 and the second actuator processor 35.

FIG. 8 illustrates a further fault case. In the fault case depicted in FIG. 8, the rack-and-pinion unit 26 has failed, more precisely both actuator processors 34, 35. It is also conceivable, however, that both rack actuators 32, 33 fail.

If no control of the rack actuators 32, 33 by the actuator processors 34, 35 is possible, as is the case in the scenario illustrated in FIG. 8, no activity signal is written to a vehicle bus 20, 22 by the actuator processors 34, 35.

The at least one remaining steering angle processor 30 thus receives no activity signal of an actuator processor 34, 35 and thereupon initiates an emergency steering.

Specifically, in this case the steering angle processor 30 sends a steering angle signal to the rear axle steering system 18 via the associated vehicle bus 20.

Alternatively or additionally, the steering angle processor 30 can send a target yaw rate to the electronic stability system 19, which controls the braking system 16 in such a way that an emergency steering function is realized.

In the exemplary embodiment according to FIG. 8, both steering angle processors 30, 31 are still operational. In this case, the first steering angle processor 30 constitutes the master, as has already been mentioned above.

If, in addition, the first steering angle processor 30 fails, the second steering angle processor 31 will control the emergency steering.

Viewed in summary, in a method of steering the vehicle upon the occurrence of a failure of a singular component, a compensation of the fault is performed within the steering unit 12, as discussed with reference to FIGS. 2 to 5.

In the event of failure of a plurality of components, a check will be made as to whether or not a steerability can be maintained by the steering unit 12 alone, and only when this is not the case will a signal transmission be used between the steering unit 12 and at least one system provided outside the steering unit 12, for example between the external steering wheel angle sensor 14, the braking system 16 and/or the rear axle steering system 18, in order to compensate the faults that have occurred and to maintain at least a residual steerability, with a compensation by means of the steering wheel angle measured by the external steering wheel angle sensor 14 being prioritized.

Only when, upon the occurrence of multiple faults, a residual steerability cannot be maintained by the steering unit 12 alone and, in addition, a control of the first or second rack actuator 32 is also not possible, will the steering wheel angle detection unit 24 send a steering angle signal to the rear axle steering system and/or a target yaw rate to the electronic stability system 19 via the first and/or second vehicle bus 20, 22.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A steer-by-wire steering system for a vehicle, comprising:

a steering unit which comprises a steering wheel angle detection unit for detecting a steering wheel angle adjusted on a steering wheel by a driver and a rack-and-pinion unit for adjusting a steering angle on a vehicle axle wherein the steering wheel angle detection unit is configured to translate the steering wheel angle adjusted by the driver into a steering angle request and to pass the steering angle request on to the rack-and-pinion unit, which is configured to adjust an axial position of a rack in accordance with the steering angle request, and at least one electronic system which is provided outside the steering unit and coupled to the steering unit via electronic lines in terms of signaling, wherein the steering wheel angle detection unit has redundant steering wheel angle sensors and redundant steering angle processors coupled to each other in terms of communication, and the rack-and-pinion unit has redundant rack actuators and has actuator processors coupled to each other in terms of communication, and wherein each steering angle processor is connected to an associated actuator processor via its own communication line so that the steering unit is configured to compensate for at least a failure of a singular component of the steering unit internally in the steering unit such that a signal transmission is effected from a steering wheel angle sensor via a steering angle processor to an actuator processor and a rack actuator and thereby the steerability is maintained without restriction when the singular fault occurs, wherein the at least one electronic system is an electronic fallback system and, together with the steering unit, constitutes an emergency steering functional system, so that upon occurrence of failures of a plurality of components in which a steerability cannot be maintained by the steering unit alone, a signal transmission between the steering unit and the at least one electronic system is enabled in order to maintain at least a residual steerability of the vehicle, and wherein the at least one electronic system arranged outside the steering unit is a rear axle steering system and/or an electronic stability system and the steering wheel angle detection unit is configured to send a steering angle request to the rear axle steering system and/or a target yaw rate to the electronic stability system via a first vehicle bus or a second vehicle bus in the event of a failure of the rack-and-pinion unit.

2. The steer-by-wire steering system according to claim 1, wherein the at least one electronic system provided outside the steering unit is coupled to at least one steering angle processor in terms of signaling and can receive control signals from the steering angle processor.

3. The steer-by-wire steering system according to claim 1, wherein a first steering wheel angle sensor, a first steering angle processor, a first rack actuator and a first actuator processor of the steering unit are supplied with electrical energy by a first power supply unit, and a second steering wheel angle sensor, a second steering angle processor, a second rack actuator and a second actuator processor of the steering unit are supplied with electrical energy by a second power supply unit.

4. The steer-by-wire steering system according to claim 1, the first steering angle processor and the first actuator processor being configured to communicate with each other also via the first vehicle bus, and the second steering angle processor and the second actuator processor being configured to communicate with each other also via the second vehicle bus.

5. The steer-by-wire steering system according to claim 1, wherein a system provided outside the steering unit is an additional, external steering wheel angle sensor which is coupled to at least one actuator processor in terms of signaling.

6. The steer-by-wire steering system according to claim 4, wherein a system provided outside the steering unit is an additional, external steering wheel angle sensor which is coupled to at least one actuator processor in terms of signaling and the external steering wheel angle sensor is configured to detect a steering wheel angle and to write the steering angle signal detected to both the first vehicle bus and to the second vehicle bus.

7. The steer-by-wire steering system according to claim 6, wherein the rack-and-pinion unit is configured to read out the steering angle signal written to the first and second vehicle buses by the external steering wheel angle sensor from one of the two vehicle buses and to control the rack actuator accordingly.

8. The steer-by-wire steering system according to claim 7, wherein the first actuator processor and/or the second actuator processor are/is configured to read out the steering angle signal written to the first and second vehicle buses by the external steering wheel angle sensor from one of the two vehicle buses and to control the rack actuator accordingly.

9. The steer-by-wire steering system according to claim 4, wherein the steering angle processors and the actuator processors are configured to write an activity signal to one of the first and second vehicle buses, the two vehicle buses being connected to each other in terms of communication.

10. The steer-by-wire steering system according to claim 1, wherein the steering angle processors and the actuator processors are configured to write an activity signal to one of the first and second vehicle buses, the two vehicle buses being connected to each other in terms of communication and wherein the steering wheel angle detection unit is configured to send a steering angle request to the rear axle steering system and/or a target yaw rate to the electronic stability system only if, in the event of a failure of the communication links between the steering angle processors and the actuator processors, no activity signal of one of the two actuator processors can be read out on at least one of the two vehicle buses and/or if both rack actuators have failed.

11. The steer-by-wire steering system according to claim 5, wherein the steering system is configured to compare a steering wheel angle detected by the external steering wheel angle sensor with a steering wheel angle detected by the steering wheel angle sensors and to determine an offset.

12. The steer-by-wire steering system according to claim 1, wherein a braking system, a rear axle steering system, an electronic stability system and an external steering wheel angle sensor are provided as electronic systems provided outside the steering unit, wherein the steer-by-wire steering system is configured to send an activity signal from a steering angle processor to an actuator processor not associated therewith via the braking system, and vice versa, and wherein the steering wheel angle detection unit is configured to send, in the event of a failure of the rack-and-pinion unit, a steering angle request to the rear axle steering system and/or a target yaw rate to the electronic stability system, which controls the braking system accordingly in order to maintain a residual steerability in the event of a failure of the rack-and-pinion unit, and/or wherein, in the event of a failure of the steering wheel angle detection unit or in the event of a failure of the communication line between the steering wheel angle detection unit and the rack-and-pinion unit, the rack-and-pinion unit is configured to read out a steering wheel angle signal of the external steering wheel angle sensor and to translate it into a steering angle request and to control the first rack actuator or the second rack actuator accordingly.

13. A method of steering a vehicle by a steer-by-wire steering system according to claim 1, wherein upon the occurrence of a failure of a singular component, a compensation of the fault is effected internally in the steering unit, and in the event of a failure of a plurality of components, a check is made as to whether or not a steerability can be maintained by the steering unit alone, and only if this is not the case is a signal transmission used between the steering unit and at least one electronic system provided outside the steering unit in order to compensate for the faults that have occurred and to maintain at least a residual steerability.

14. The method according to claim 13, wherein the steer-by-wire steering system includes a first vehicle bus and a second vehicle bus, wherein the first steering angle processor and the first actuator processor are configured to communicate with each other also via the first vehicle bus, and the second steering angle processor and the second actuator processor are configured to communicate with each other also via the second vehicle bus, wherein when, upon the occurrence of multiple faults, a residual steerability cannot be maintained by the steering unit alone, the first or the second actuator processor reads out a steering signal of an external steering wheel angle sensor via the first vehicle bus or the second vehicle bus and controls the first or the second rack actuator accordingly.

15. The method according to claim 14, wherein when, upon the occurrence of multiple faults, a residual steerability cannot be maintained by the steering unit alone and, in addition, a control of the first or the second rack actuator is also not possible, the steering wheel angle detection unit sends a steering angle signal to a rear axle steering system and/or a target yaw rate to an electronic stability system via the first and/or the second vehicle bus.

16. The method according to claim 13, wherein upon the occurrence of a failure in which the failure of a further component cannot be compensated by the steering unit, a maximum vehicle speed is limited to a defined value and a maximum driving time for which a journey can be continued at the defined maximum vehicle speed is fixed.

17. The method according to claim 13, wherein, after the maximum driving time has elapsed or if, during the driving time, a failure of a further component occurs due to which a residual steerability cannot be maintained by the steering unit alone, the vehicle is placed in a creep mode.

* * * * *